(12) United States Patent
Green et al.

(10) Patent No.: US 7,949,224 B2
(45) Date of Patent: May 24, 2011

(54) DATA PROCESSING SYSTEM AND METHOD

(76) Inventors: Stuart Antony Green, Sheffield (GB); John Kendall Reid, Southampton (GB)

(*) Notice: Subject to any disclaimer, the term of this patent is extended or adjusted under 35 U.S.C. 154(b) by 1391 days.

(21) Appl. No.: 10/727,069

(22) Filed: Dec. 2, 2003

(65) Prior Publication Data
US 2005/0005299 A1    Jan. 6, 2005

(30) Foreign Application Priority Data
Jul. 3, 2003   (GB) .................................. 0315589.2

(51) Int. Cl.
*H04N 9/80*   (2006.01)
*H04N 5/93*   (2006.01)
(52) U.S. Cl. .................... 386/239; 386/248; 386/353
(58) Field of Classification Search .............. 386/95, 386/97, 125, 83, 126, 46, 239, 248, 353
See application file for complete search history.

(56) References Cited

U.S. PATENT DOCUMENTS

| | | | |
|---|---|---|---|
| 5,703,997 A * | 12/1997 | Kitamura et al. | 386/97 |
| 5,907,658 A * | 5/1999 | Murase et al. | 386/95 |
| 6,246,402 B1 * | 6/2001 | Setogawa et al. | 715/723 |
| 2004/0220791 A1 * | 11/2004 | Lamkin et al. | 703/11 |
| 2005/0008348 A1 * | 1/2005 | Collar et al. | 386/125 |

FOREIGN PATENT DOCUMENTS

| | | |
|---|---|---|
| EP | 1237071 A1 | 4/2002 |
| GB | 2353393 | 2/2001 |
| JP | 060089548 A | 3/1994 |
| WO | WO 03/021956 A2 | 3/2003 |
| WO | WO 03/098628 A2 | 11/2003 |
| WO | WO 2004/007042 A1 | 1/2004 |
| WO | WO 2004-081765 A2 | 9/2004 |
| WO | WO 2005/004364 A2 | 1/2005 |

* cited by examiner

*Primary Examiner* — Thai Tran
*Assistant Examiner* — Hung Q Dang
(74) *Attorney, Agent, or Firm* — Daniel W. Roberts; Law Offices of Daniel W. Roberts, LLC

(57) ABSTRACT

Embodiments of the present invention relate to a data processing system including means to play an interruptible or skipable video sequence; and a random number generator for generating a random number associated with an interruption of the interruptible or skipable video sequence.

48 Claims, 2 Drawing Sheets

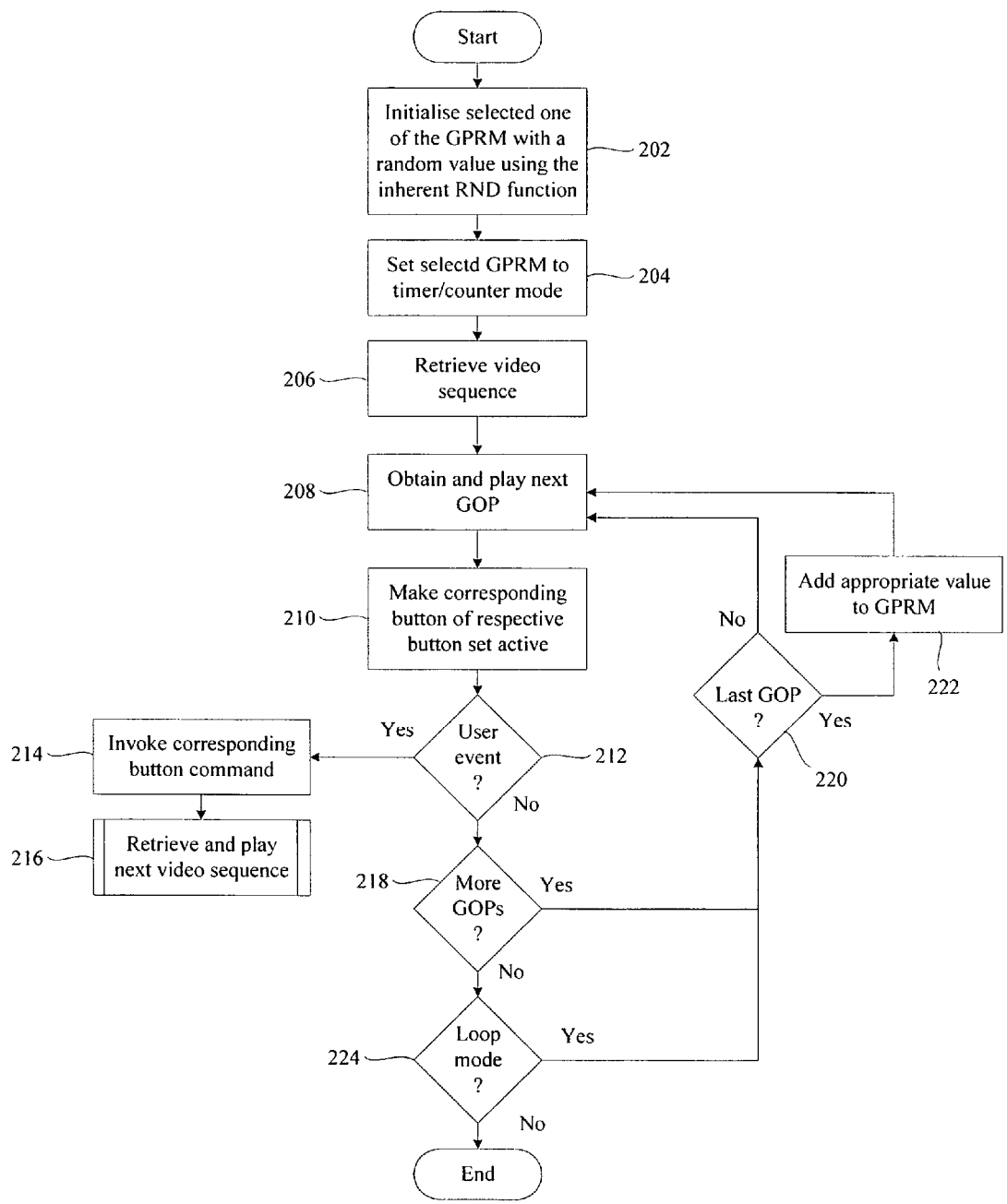

DATA PROCESSING SYSTEM AND METHOD

RELATED APPLICATION

This application claims priority to Great Britain Patent Application No. GB0315589.2, filed Jul. 3, 2003, the disclosure of which is hereby incorporated herein by reference.

FIELD OF THE INVENTION

The present invention relates to a data processing system and method and, more particularly, to such a system and method for generating random numbers.

BACKGROUND OF THE INVENTION

Many computer applications call for the use of random numbers, which are employed to give unpredictability to the behaviour of a program. Many computer platforms provide a so-called random number generator, which is typically a RND(N) function that returns a random number in the range of 0 to N−1 (or sometimes 1 to N). It will be appreciated by those skilled in the art that the word "random" is a misnomer since the random numbers produced are usually created using a linear congruential generator (LCG). An LCG sequence generator calculates a series of numbers, $r_i$, of the form $r_{i+1}=F(r_i)$. Successive numbers in the number sequence are a function of previous numbers. If the RND(N) function performs fairly, each invocation of the function should yield values 0 to N−1 with equal probability. Typical, an LCG will have a large period (that is, the sequence will produce a large number of values before it repeats). If an application requires RND(N), where N is relatively small, then the output of the LCG is manipulated to yield a value that lies in the range 0 to N−1. For example, the result of each step of the LCG can be taken to modulo n in order to produce values in the required range. As a consequence, repeated calls of RND(N) can return repetitions of values before N values have been returned.

The DVD-Video specification as published by the DVD Forum supports a random number function, RND[N], to return a random number within a specified range. However, the specification does not contain any explicit technical guidance to implement this function. It is well known within the industry that some manufacturers have implemented the function in a way that their DVD players always generate the same random number sequence. Such a situation can occur when an LCG is seeded with a constant value. Consequently, companies engaged in authoring DVD-Video discs cannot assume that a different random number sequence will be generated each time a disc is played. This is particularly problematical for games, such as quizzes, where, for some devices, it can result in the same question sequence being delivered each time the disc is played.

Another feature of DVD-Video is the counter mode of the GPRM registers. A GPRM can be placed in counter mode such that its value is incremented by one for each elapsed second from the moment the counter mode is invoked. This feature can be used effectively to seed an LCG with a value that is time-dependent and likely to change as between successive plays of a disc. While this may go some way to overcoming the limitation of players that have a deficient RND implementation, some manufacturers have defective implementations of the counter feature such that registers are incorrectly incremented in contrast to the DVD-Video specification requirements. Furthermore, it is known that there are some DVD players that have defective implementations of both the RND function and the counter mode of the GPRMs.

It is an object of embodiments of the present invention at least to mitigate some of the problems of the prior art.

SUMMARY OF THE INVENTION

Accordingly, a first aspect of embodiments of the present invention provides a data processing system comprising means for playing an interruptible or skipable video sequence; and a random number generator for generating a random number associated with an interruption of the interruptible or skipable video sequence.

Advantageously, embodiments of the present invention allow a DVD implementation independent random number generator to be realised that is not beset with at least some of the above mentioned problems.

A further aspect of embodiments of the present invention provides a data processing system comprising a reader to read data representing a video sequence and a number of associated data each having a corresponding command; a presentation engine for outputting the video sequence derived from the data representing the video sequence, a navigation engine, responsive to an event, to invoke one of the corresponding commands according to the output of the video sequence; and means to derive a first value from the invoked command of the corresponding commands. It will be appreciated that the reader might form part of a DVD player or DVD drive to read data from a DVD.

A still further aspect of embodiments of the present invention provides a storage medium comprising data representing a video sequence and a number of associated data each having a corresponding command; and data to derive a first value from one of the corresponding commands in response to an event. Preferably, the storage medium is a DVD.

Other features of the invention are described below and claimed in the claims.

BRIEF DESCRIPTION OF THE DRAWINGS

Embodiments of the present invention will now be described, by way of example only, with reference to the accompanying drawings in which:

FIG. 2 depicts a flowchart according to some embodiments of the present invention.

DESCRIPTION OF THE PREFERRED EMBODIMENTS

Figure 1:
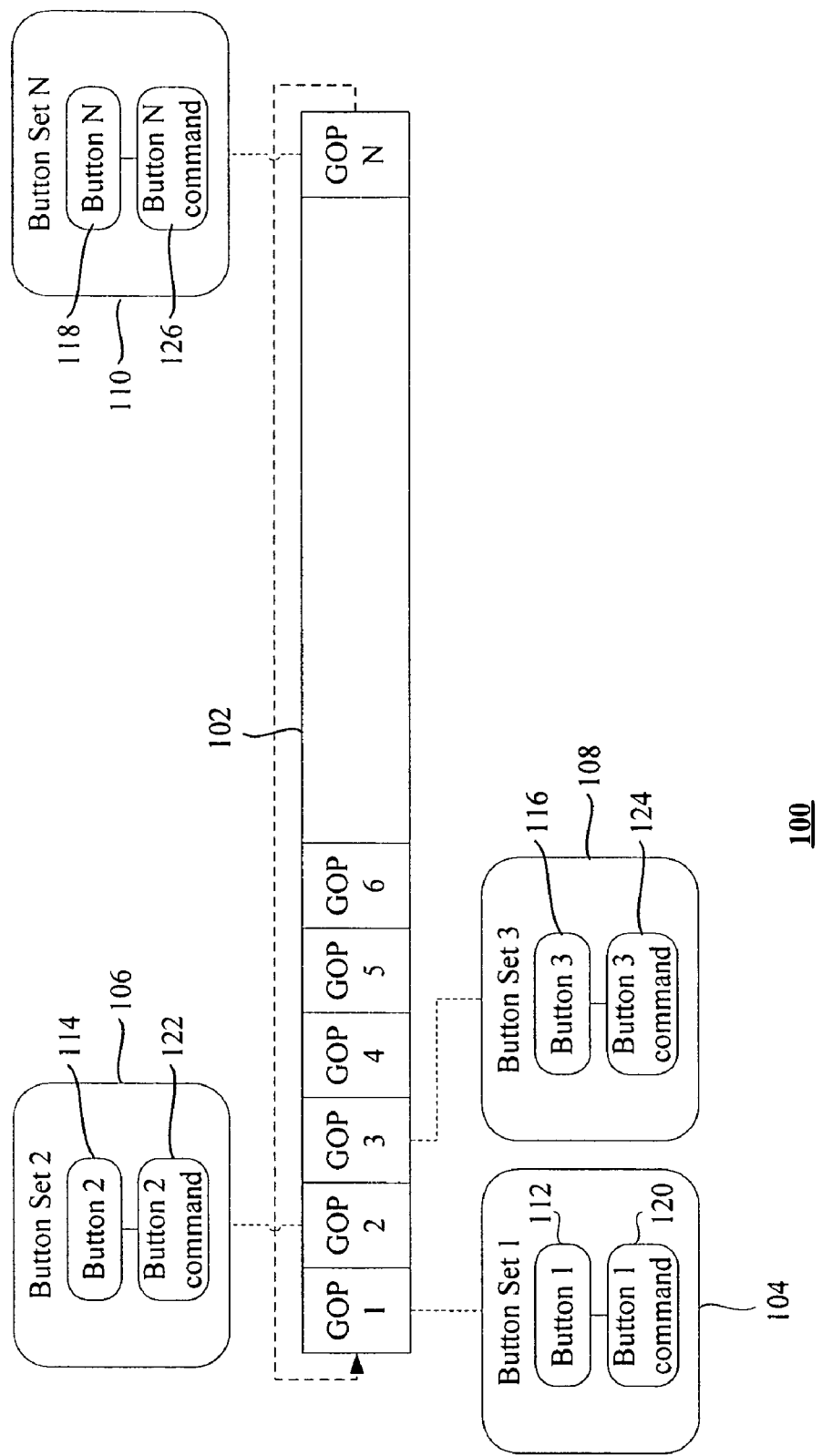
FIG. 1 shows a skipable sequence according to some embodiments of the present invention.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 shows an assembly of data structures 100 used by embodiments of the present invention. The assembly 100 comprises an interruptible or skipable video sequence 102 having a number of group-of-pictures structures GOP 1 to GOP N. Each group-of-pictures structure GOP 1 to GOP N has an associated button set 104 to 110. Each button set 104 to 110 comprises a respective active button 112 to 118. Each button set 112 to 118 has an associated button command 120 to 126 that is performed in response to a navigation engine (not shown) detecting invocation of a respective active button 112 to 118.

The video sequence 102 and corresponding button sets 104 to 110 are arranged such that only the button set associated with a currently active or currently playing or processed group-of-pictures structure is able to be invoked. Therefore, for example, the first button set 104 is active during processing of the first group-of-pictures structure GOP 1 and so on. The button sets 104 to 110 are arranged so that, upon generation of a user event, such as, for example, the user depressing the "OK" button of a remote control (not shown), the corresponding button command 120 to 126 is invoked.

Prior to playing the initial video sequence 102, one of the GPRMs (not shown) is initialised using a value. Preferably, the initialisation value is a random value generated using, for example, the inherent RND function provided by DVD players. The initialised GPRM is then set to counter mode. This second step of setting the GPRM to counter mode is optional.

A button command has the following format
ADD<GPRM><value>; LNK<next-sequence>.

This command results in adding the value represented by <value> to the content of register <GPRM>, that is, the register initialised using the random value, and then linking or jumping to the next or a further video sequence identified by <next-sequence>. Preferably, the value of <value> is unique or distinct for each button set of the sequence. In an embodiment, the values chosen for <value> are the same as the GOP numbers. Therefore, for example, assuming the user presses "OK" during the processing or playing of the first group of pictures structure GOP1, the value 1 is added to the GPRM, during the second group-of-pictures structure GOP2, the value 2 is added to the GPRM and so on. Alternatively, the values used for <value> can be non-sequential or, themselves, random numbers.

Preferably, the video sequence 102 is arranged to repeat, which will force the user to press "OK" to advance the programme and a post command is added to the sequence in the form
ADD<GPRM><value2>,
where <GPRM> is the register initialised previously and <value2> is a further number added to the content of the GPRM upon repetition of the sequence.

If, as is the case in preferred embodiments, the values associated with the button commands are sequential and start from the value "1", it will be appreciated that the value for the mth GOP has the value m. It will be appreciated that ADD<GPRM><value2> is a command that is executed each time the whole of the video sequence 102 has been played.

When a random number is subsequently required, the previously initialised GPRM is returned to normal register mode and its current value is used as the random number. It will be appreciated that since the point at which a user chooses to skip the video sequence might vary as between plays, it will, typically, result in a different value being contained within the GPRM even on devices that have defective implementations of the RND function and defective register counting mode implementations.

The present invention is described herein with reference to flowchart and/or block diagram illustrations of methods, systems, and computer program products in accordance with exemplary embodiments of the invention. These flowchart and/or block diagrams further illustrate exemplary data processing operations, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Referring to FIG. 2, there is shown a flowchart 200 of the operations performed by an embodiment of the present invention. One of the GPRM registers is selected and initialised with a random value using the inherent RND function at block 202. At block 204, the selected GPRM register is set to counter mode. At block 206, the video sequence is played by processing the first, or next, GOP structure to produce the video sequence or, at least, part of a video sequence by the navigation and presentation engines (not shown) as is conventional within a DVD player. At block 210, which is performed, preferably, very shortly after, before or substantially simultaneously, with block 208, a menu (not shown), comprising the button of the button set corresponding to the currently played GOP structure, is made active for the duration of the video sequence currently being played. A test is performed, at block 212, to determine whether or not a user event such as, for example, the "OK" button (not shown) has been depressed. If it is determined that a user event has occurred or has been detected, the corresponding button command is invoked at block 214, which will involve adding an appropriate value to the GPRM. The associated LNK aspect of the command is also invoked at block 214, which leads to the playing of the next video sequence at block 216.

If the determination at block 212 is negative, a test is performed at block 218 to determine whether or not there are further GOP structures to process. If the determination at block 218 is positive, a test is performed at block 220 to determine whether the most recently processed GOP structure was the last GOP structure of the video sequence 102. If the determination at block 220 is negative, processing continues at block 208 where the next GOP is retrieved and processed. However, if the most recently processed GOP structure was the last such structure of the video sequence 102, a predetermined value, <value2>, is added to the GPRM at block 222 and processing then continues at block 208 where the first group of pictures structure GOP 1 is retrieved again.

If the determination at block 218 is negative, it is determined at block 224 whether the video sequence 102 has been arranged to loop or repeat automatically. It will be appreciated in most preferred embodiments that the video sequence 102 will be arranged to repeat whereupon processing continues from block 220. However, if the video sequence is not arranged to repeat, processing terminates and the current value of the GPRM is used as the random number or at least as a seed for a random number generator or random number sequence generator.

In preferred embodiments, the above calculated number, that is, the number contained within the GPRM is used as a seed value for a LCG algorithm that is used to calculate a non-repeating sequence of pseudo-random numbers, that is, the generated sequence does not contain a repetition of any of the numbers until the whole of the sequence has been generated. However, once the full sequence has been generated, that full sequence will, itself, repeat. Preferably, the value contained within the GPRM is used as the first value, $r_1$, in the equation $$r_{i+1} = (a.r_i + b) \bmod c,$$

where c is a prime number and a and b are constants selected according to a desired level of performance of the LCG, that is, according to the quality of the random numbers required.

It will be appreciated that embodiments can be realised in which multiple video sequences together with respective button sets as described above are used to generate the random number or respective random numbers such that the ultimately used random number is associated with or derived from data associated with those multiple video sequences or the embodiments are arranged to produce a number of random numbers using the multiple video sequences.

Although the above embodiments have been described with reference to an LCG, embodiments of the present invention are not limited to such LCGs. Embodiments can be realised in which other generators are used. For example, two or more LCGs can be combined to produce a Combined Linear Congruential Generator (CLCG) in which the two LCGs are combined usually by subtraction or ex-or. Still further, Recursive or Extended LCGs can be used to improve the randomness of low order bits that tend to be less random in LCGs. Other generators that might be used, having obtained a seed number, are Multiple Recursive Generators, Inverse Congruential Generators, Combined Inverse Congruential generators, Multiply with Carry Generators, Multiply or Single Feedback shift registers, Generalised Feedback Shift Registers including Twisted Feedback Shift Registers and Multiple GFSR and so on.

The flowchart of FIG. 2 illustrates the architecture, functionality, and operations of some embodiments of methods, systems, and computer program products in accordance with some embodiments of the present invention. In this regard, each block represents a module, segment, or portion of code, which comprises one or more executable instructions for implementing the specified logical function(s). It should also be noted that in other implementations, the function(s) noted in the blocks may occur out of the order noted in FIG. 2. For example, two blocks shown in succession may, in fact, be executed substantially concurrently or the blocks may sometimes be executed in the reverse order, depending on the functionality involved.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings) and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of generating a random number associated with a user initiated interruption of a video sequence, comprising:
   sequentially presenting, by a playback device, to a user a plurality of group-of-picture ("GOP") structures of an MPEG standard collectively providing a first video sequence, each group-of-picture structure having a predetermined seed component and a navigation component, the seed component having a seed value;
   in response to a user initiated interruption during the presentation of a GOP structure, receiving the seed component and the navigation component from the interrupted GOP structure;
   providing a random number based at least in part on the seed component wherein as a user initiated point of interruption will vary from one sequence presentation to another, the varying point of interruption to receive the seed component insures a random number as the random number is derived from the sum of a predetermined value and the seed value; and
   linking or jumping to a second video sequence identified by the navigational component.

2. The method of claim 1, wherein the seed component is combined with a system generated number to provide the random number.

3. The method of claim 1, wherein each GOP structure has an associated active button, each active button having an associated button command that is performed in response to a navigation engine detecting invocation of a respective active button of a currently active GOP structure, invocation of the active button directing a corresponding button command to provide the seed component and the navigation component.

4. The method of claim 1, wherein a time varying nature of the user initiated responses provides a human based random element to overcome defective implementations of a RND function and/or defective register counting.

5. The method of claim 1, wherein the random number seeds a random number generator.

6. The method of claim 1, wherein the presentation of the plurality of GOP structures is transparent, the user perceiving the first video sequence unaware of the transition from GOP structure to GOP structure and each structure's associated seed component.

7. The method of claim 1, wherein the first video sequence is repeated until the user interruption is initiated.

8. The method of claim 1, wherein the method is stored on a computer-readable medium as a computer program, which when executed by a computer will perform the stems of generating a random number associated with a user initiated interruption of a video sequence.

9. A computing device including a processor configured to perform the method of generating a random number associated with a user initiated interruption of a video sequence as presented in claim 1.

10. A non-transitory machine readable medium on which is stored a computer program for generating a random number associated with a user initiated interruption of a video sequence, the computer program comprising instructions which when executed by a computer system perform the steps of:
   sequentially presenting to a user a plurality of group-of-picture ("GOP") structures of an MPEG standard collectively providing a first video sequence, each group-of-picture structure having a predetermined seed component and a navigation component, the seed component having a seed value;
   in response to a user initiated interruption during the presentation of a GOP structure, receiving the seed component and the navigation component from the interrupted GOP structure;
   providing a random number based at least in part on the seed component wherein as a user initiated point of interruption will vary from one sequence presentation to another, the varying point of interruption to receive the seed component insures a random number as the random number is derived from the sum of a predetermined value and the seed value; and
   linking or jumping to a second video sequence identified by the navigational component.

11. The non-transitory machine readable medium of claim 10, wherein the seed component is combined with a system generated number to provide the random number.

12. The non-transitory machine readable medium of claim 10, wherein each GOP structure has an associated active button, each active button having an associated button command that is performed in response to a navigation engine detecting invocation of a respective active button of a currently active GOP structure, invocation of the active button directing a corresponding button command to provide the seed component and the navigation component.

13. The non-transitory machine readable medium of claim 10, wherein a time varying nature of the user initiated responses provides a human based random element to overcome defective implementations of a RND function and/or defective register counting.

14. The non-transitory machine readable medium of claim 10, wherein the random number seeds a random number generator.

15. The non-transitory machine readable medium of claim 10, wherein the presentation of the plurality of GOP structures is transparent, the user perceiving the first video sequence unaware of the transition from GOP structure to GOP structure and each structure's associated seed component.

16. The non-transitory machine readable medium of claim 10, wherein the first video sequence is repeated until the user interruption is initiated.

17. The non-transitory machine readable medium of claim 10, wherein in a first instance the seed component of each GOP structure is a unique value, and in a second instance the seed component of each GOP structure is a navigation command to a location providing a unique value.

18. The non-transitory machine readable medium of claim 10, wherein the navigation component is the same for all GOP structures.

19. The non-transitory machine readable medium of claim 10, wherein the computer readable medium is a DVD.

20. An audiovisual product recorded on a non-transitory recording medium, the audiovisual product structured and arranged to provide a random number associated with a user initiated interruption of a video sequence when read by a DVD reading system, the product comprising:
   a data structure recorded on the recording medium comprising data defining:
      at least a first video sequence provided by a sequential plurality of group-of-picture ("GOP") structures of an MPEG standard, each GOP structure having a predetermined seed component and a navigation component, the seed component having a seed value;
      at least one second video sequence; and
      executable code which when executed by a playback device will present the first video sequence, and in response to a user initiated interruption during the presentation of a GOP structure receiving the seed component and navigation component, wherein as a user initiated point of interruption will vary from one sequence presentation to another, the varying point of interruption to receive the seed component insures a random number as the random number is derived from the sum of a predetermined value and the seed value, the navigation component used by a navigation engine to link or jump to a determined second video sequence.

21. The audiovisual product of claim 20, wherein the product is a DVD and the playback device is a DVD player.

22. The audiovisual product of claim 20, wherein the seed component is combined with a system generated number to provide the random number.

23. The audiovisual product of claim 20, wherein each GOP structure has an associated active button, each active button having an associated button command that is performed in response to a navigation engine detecting invocation of a respective active button of a currently active GOP structure, invocation of the active button directing a corresponding button command to provide the seed component and the navigation component.

24. The audiovisual product of claim 20, wherein a time varying nature of the user initiated responses provides a human based random element to overcome defective implementations of a RND function and/or defective register counting.

25. The audiovisual product of claim 20, wherein the random number seeds a random number generator.

26. The audiovisual product of claim 20, wherein the presentation of the plurality of GOP structures is transparent, the user perceiving the first video sequence unaware of the transition from GOP structure to GOP structure and each structure's associated seed component.

27. The audiovisual product of claim 20, wherein the first video sequence is repeated until the user interruption is initiated.

28. The audiovisual product of claim 20, wherein in a first instance the seed component of each GOP structure is a unique value, and in a second instance the seed component of each GOP structure is a navigation command to a location providing a unique value.

29. The audiovisual product of claim 20, wherein the navigation component is the same for all GOP structures.

30. A DVD product structured and arranged to provide a random number associated with a user initiated interruption of a video sequence when read by a DVD reading system, comprising:
   a DVD;
   a data structure recorded to the DVD comprising data defining;
      at least a first video sequence provided by a sequential plurality of group-of-picture ("GOP") structures of an MPEG standard each GOP structure associated with a respective command;
      at least one second video sequence; and
      executable code which when executed by a DVD player will present the first video sequence, and in response to a user initiated interruption during the presentation of a GOP structure, execute the respective command, the executed command providing a seed component having a seed value and a navigation component, wherein as a user initiated point of interruption will vary from one sequence presentation to another, the varying point of interruption to receive the seed component insures a random number as the random number is derived from the sum of a predetermined value and the seed value, the navigation component used by a navigation engine to link or jump to a determined second video sequence.

31. The DVD product of claim 30, wherein the seed component is combined with a system generated number to provide the random number.

32. The DVD product of claim 30, wherein each GOP structure has an associated active button, each active button having an associated button command that is performed in response to a navigation engine detecting invocation of a respective active button of a currently active GOP structure, invocation of the active button directing a corresponding button command to provide the seed component and the navigation component.

33. The DVD product of claim 30, wherein a time varying nature of the user initiated responses provides a human based random element to overcome defective implementations of a RND function and/or defective register counting.

34. The audiovisual product of claim 30, wherein the random number seeds a random number generator.

35. The DVD product of claim 30, wherein the presentation of the plurality of GOP structures is transparent, the user perceiving the first video sequence unaware of the transition from GOP structure to GOP structure and each structure's associated seed component.

36. The DVD product of claim 30, wherein the first video sequence is repeated until the user interruption is initiated.

37. The DVD product of claim 30, wherein in a first instance the seed component of each GOP structure is a unique value, and in a second instance the seed component of each GOP structure is a navigation command to a location providing a unique value.

38. The DVD product of claim 30, wherein the seed component of each GOP structure is a navigation command to a location providing a unique value.

39. The DVD product of claim 30, wherein the navigation component is the same for all GOP structures.

40. A method of generating a random number associated with a user initiated interruption of a video sequence, comprising:
   sequentially presenting to a user a plurality of group-of-picture ("GOP") structures collectively providing a first video sequence, each GOP structure having an associated predetermined seed value and a navigation component;
   in response to a user initiated interruption of the first video sequence during the presentation of a GOP structure, receiving the seed value and the navigation component associated with the interrupted GOP structure;
   providing a random number based at least in part on the seed value, the seed value of a first GOP structure of the first video sequence being different from the seed value of a second GOP structure of the first video sequence, wherein as a user initiated point of interruption will vary from one sequence presentation to another, the varying point of interruption to receive the seed value insures a random number as the random number is derived from the sum of a predetermined value and the seed value; and
   linking or jumping to a second video sequence identified by the navigational component.

41. The method of claim 40, wherein a time varying nature of the user initiated responses provides a human based random element to overcome defective implementations of a RND function and/or defective register counting.

42. The method of claim 40, wherein the presentation of the plurality of GOP structures is transparent, the user perceiving the first video sequence unaware of the transition from GOP structure to GOP structure and each structure's associated seed component.

43. A non-transitory machine readable medium on which is stored a computer program for generating a random number associated with a user initiated interruption of a video sequence, the computer program comprising instructions which when executed by a computer system perform the steps of:
   sequentially presenting to a user a plurality of group-of-picture ("GOP") structures collectively providing a first video sequence, each group-of-picture structure having an associated predetermined seed value and a navigation component;
   in response to a user initiated interruption of the first video sequence during the presentation of a GOP structure, receiving the seed value and the navigation component associated with the interrupted GOP structure;
   providing a random number based at least in part on the seed value wherein as a user initiated point of interruption will vary from one sequence presentation to another, the varying point of interruption to receive the seed value insures a random number as the random number is derived from the sum of a predetermined value and the seed value; and linking or jumping to a second video sequence identified by the navigational component, the seed component of a first GOP structure of the first video sequence being different from the seed component of a second GOP structure of the first video sequence.

44. The method of claim 43, wherein a time varying nature of the user initiated responses provides a human based random element to overcome defective implementations of a RND function and/or defective register counting.

45. The method of claim 43, wherein the presentation of the plurality of GOP structures is transparent, the user perceiving the first video sequence unaware of the transition from GOP structure to GOP structure and each structure's associated seed component.

46. An audiovisual product recorded on a non-transitory recording medium, the audiovisual product structured and arranged to provide a random number associated with a user initiated interruption of a video sequence when read by a DVD reading system, the product comprising:

a data structure recorded on the recording medium comprising data defining:

at least a first video sequence provided by a sequential plurality of group-of-picture ("GOP") structures, each GOP structure having a predetermined seed value and a navigation component, the seed value of a first GOP structure of the first video sequence being different from the seed value of a second GOP structure of the first video sequence;

at least one second video sequence; and executable code which when executed by a playback device will present the first video sequence, and in response to a user initiated interruption of the first video sequence during the presentation of a GOP structure receiving the seed component and navigation component, wherein as a user initiated point of interruption will vary from one sequence presentation to another, the varying point of interruption to receive the seed value insures a random number as the random number is derived from the sum of a predetermined value and the seed value, the navigation component being used by a navigation engine to link or jump to a determined second video sequence.

47. The audiovisual product of claim 46, wherein a time varying nature of the user initiated responses provides a human based random element to overcome defective implementations of a RND function and/or defective register counting.

48. The audiovisual product of claim 46, wherein the presentation of the plurality of GOP structures is transparent, the user perceiving the first video sequence unaware of the transition from GOP structure to GOP structure and each structure's associated seed component.

* * * * *